Jan. 1, 1935.  E. P. KINNE  1,986,440
COUPLER
Filed Jan. 2, 1930  6 Sheets-Sheet 1

Inventor:
Edmund P. Kinne

Jan. 1, 1935.　　　　　E. P. KINNE　　　　　1,986,440
COUPLER
Filed Jan. 2, 1930　　　　6 Sheets-Sheet 2

Inventor:
Edmund P. Kinne,

Jan. 1, 1935.    E. P. KINNE    1,986,440
COUPLER
Filed Jan. 2, 1930    6 Sheets—Sheet 6

Inventor:
Edmund P. Kinne,

Patented Jan. 1, 1935

1,986,440

UNITED STATES PATENT OFFICE 1,986,440

COUPLER

Edmund P. Kinne, Alliance, Ohio, assignor to American Steel Foundries, Chicago, Ill., a corporation of New Jersey Application January 2, 1930, Serial No. 417,895

34 Claims. (Cl. 213—127)

This invention pertains to coupler mechanism and more particularly to top operating rotary type D couplers.

An object of the invention is to improve the operation of couplers and more particularly the standard A. R. A. rotary type D couplers in a manner whereby the coupler can always be operated positively and easily to either lock-set or full knuckle-throw positions through the medium of the uncoupling rod.

Another object is to provide simple, reliable, and efficient coupler operating mechanism having cooperating parts whereby a maximum operating force may be transmitted to the lock for facilitating the operation of the coupler.

Still another object is to provide top lift mechanism for a rotary type D coupler whereby the operating force heretofore transmitted to the lock of such type of coupler is increased.

Yet another object is to provide an improved top lift coupler which not only will properly function as a top lift coupler, but is of such character as to make it practical to substitute for the bottom lift coupler, one coupler therefore being capable of taking the place of the two now required.

A further object of the invention is to provide coupler mechanism, the various parts of which cooperate in an improved manner to accomplish the best results under service conditions.

A still further object is to provide a top lift coupler whereby the frictional resistance between the lock and the coupler head is eliminated.

Yet a further object is to provide a coupler wherein the lock is suspended at a point substantially in vertical alignment with the center of gravity of said lock.

Another further object is to provide a coupler which is readily adaptable for use wherein the operating force is substantially immediately in the rear of the operating mechanism of the coupler, or wherein the operating device for operating the coupler is so disposed as to apply a direct pull rearward of the coupler head.

Yet another further object is to provide a coupler wherein the operating mechanism is so arranged that the coupler is interlocked with substantially no lost motion; wherein the coupler mechanism is so arranged that the applied force for operating the knuckle is increasingly applied to the operating mechanism; and wherein positive means is provided for preventing release of the coupler anti-creep.

An additional object is to provide a coupler wherein the operating mechanism is so arranged that the coupler may be operated by a directly connected operating rod permitting coupler movement both in and out, and side angling, thereby eliminating the necessity for slack devices; and wherein coupler operating mechanism is provided requiring no initial slack movement to unlock the anti-creep.

With these and various other objects in view, the invention may consist of certain novel features of construction and operation, as will be more fully described and particularly pointed out in the specification, drawings and claims appended hereto.

In the drawings, which illustrate an embodiment of the device and wherein like reference characters are used to designate like parts—

Referring first of all more particularly to the form of device illustrated in Figures 1 to 6 inclusive and 10 to 13 inclusive, the standard A. R. A. type D coupler is shown having a head 50 provided with a knuckle 52 pivoted thereto as by the pin 54. The knuckle is provided with an arm 56 extending inwardly into the recess in the coupler head and provided with a bearing face or tail 58. This face or tail is adapted to be contacted by one arm of the pivotally mounted knuckle thrower 60, the other arm thereof being adapted to be operated by the depending leg 62 of the lock 64 disposed in a vertical recess in the coupler head. The recess is open at the bottom, and the leg 62 of the lock is slotted, as at 66, for the reception of bottom operating mechanism, should the same be used.

The head 68 of the lock is provided with a forwardly and upwardly extending finger 70 and is provided with an inwardly and upwardly substantially T-shaped slot 72, which slot is adapted to receive the transverse trunnions 74 provided on the lift link 76. Said lift link is substantially L-shaped in elevation, the vertical leg 78 being provided with transverse stops 80 disposed intermediate trunnions 74 and trunnions 82 provided adjacent the top thereof, said trunnions being adapted to be received in the slots 84 disposed in the spaced arms 86 of the lift rotor 88. The other leg 90 of the lift link is adapted in certain positions of operation to have bearing engagement with a side wall 92 defining the hole in the coupler head.

Each arm 86 of the lift rotor is provided with a stop portion 94, and bearing portions 96, the latter being adapted to be received in upstanding supports 98 and 100 provided on the coupler head adjacent the slot 102 accommodating the arms 86 of the lift rotor. One end of the bearing 96 is provided with an eye 104, said eye being provided with upstanding and depending shoulders 106 and 108 for engagement with a portion of the operating rod extending through the eye. As shown, the support 100 is of the open type in the case where only one eye 104 is used, the same being closed by means of a bearing piece 110 and the key 112 extending through the bearing piece and the arms of the support.

Figure 1:
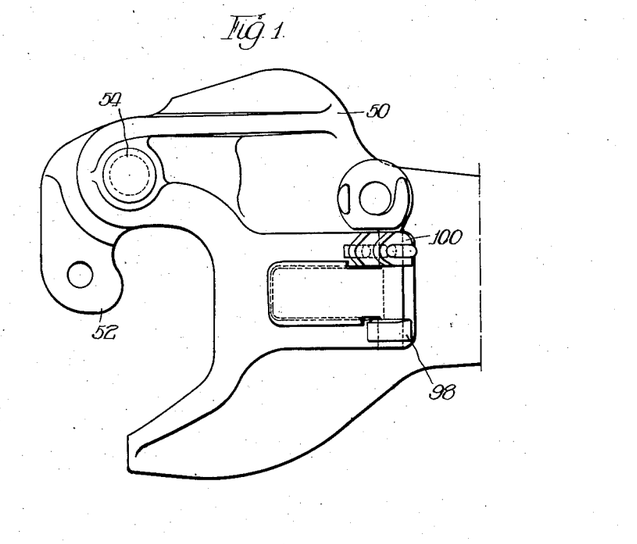
Figure 1 is a top plan view of a portion of a coupler showing the parts in locked position.
Figure 2:
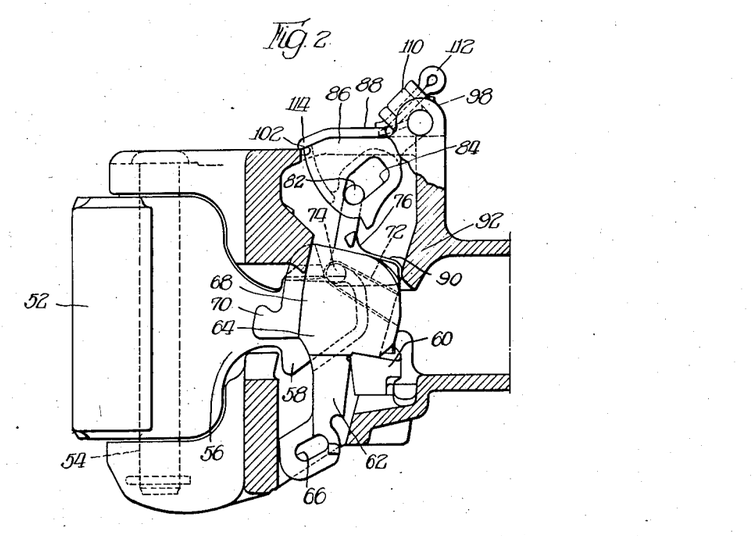
Figure 2 is a sectional side elevation of the coupler shown in Figure 1 showing the parts in locked position.
Figure 3:
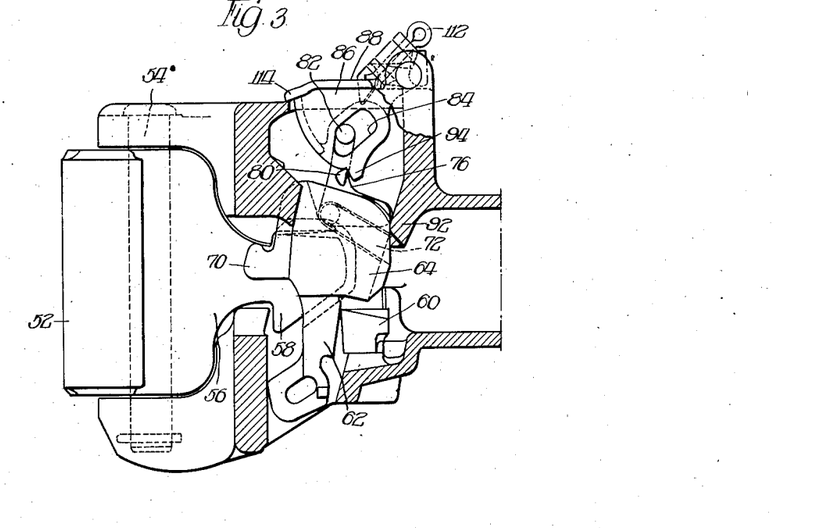
Figure 3 is a sectional elevation corresponding to Figure 2 showing the parts in anti-creep position.

In operation, assuming the knuckle to be in closed position and the operating parts in corresponding position, as shown in Figures 1 and 2, if it is desired to throw the knuckle, movement of rotation is imparted to the eye 104 in clockwise direction, as viewed in the figures, whereby the lift rotor is moved upwardly, moving the top flange 114, which provides shoulders for said rotor, out of engagement with the top of the coupler and away from its supporting engagement of the lift rotor. Movement of the lift rotor will move the lift link substantially vertically upward, and the disposition of the stops 80 and 94 is such that they will not contact as the trunnions 82 are in the apex 116 of the slot 84. It will be noticed that the lift link is maintained in its forward position when the knuckle is closed by virtue of the contact between the arm 90 and the wall 92 of the coupler head (see Figure 2).

Vertical movement of the lift link will cause substantially vertical movement of the lock as the trunnions 82 are substantially in a vertical line with the center of gravity of the lock. The lock will move vertically upward then until the finger 70 contacts a shoulder 118 of the coupler head. Continued movement of the lift rotor causes the trunnions 82 to move rearwardly in slot 84, thereby increasing the mechanical advantage by decreasing the effective lifter arm as defined by the distance between the bearing 96 and the trunnions 82, whereupon the depending leg 62 of the lock is caused to rotate in a counter-clockwise direction, operating the knuckle thrower to open the knuckle.

Figure 4:
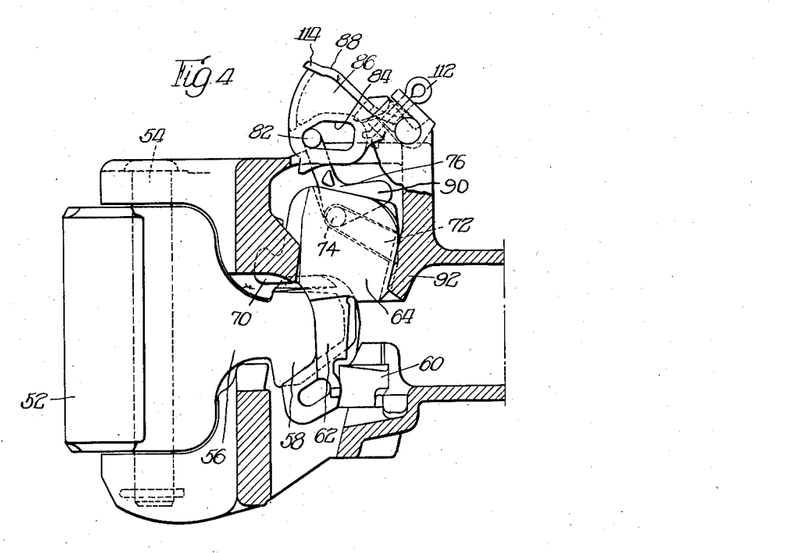
Figure 4 is a sectional elevation corresponding to Figure 2 showing the parts in lock-set position.
Figure 5:
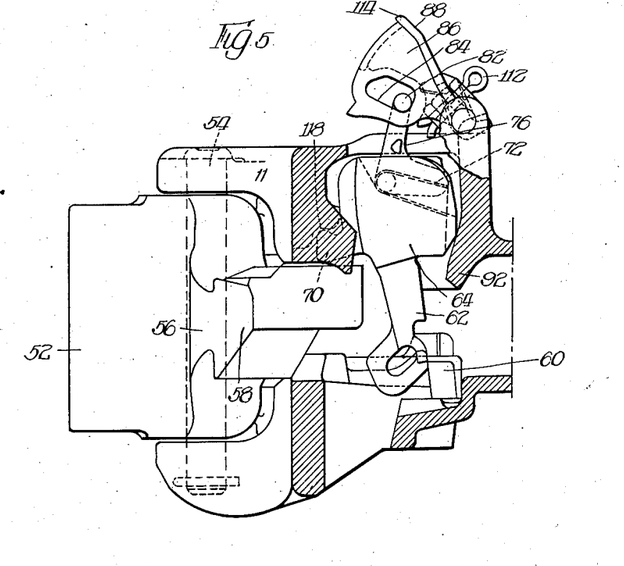
Figure 5 is a sectional elevation corresponding to Figure 2 showing the parts in full knuckle-throw position.
Figure 6:
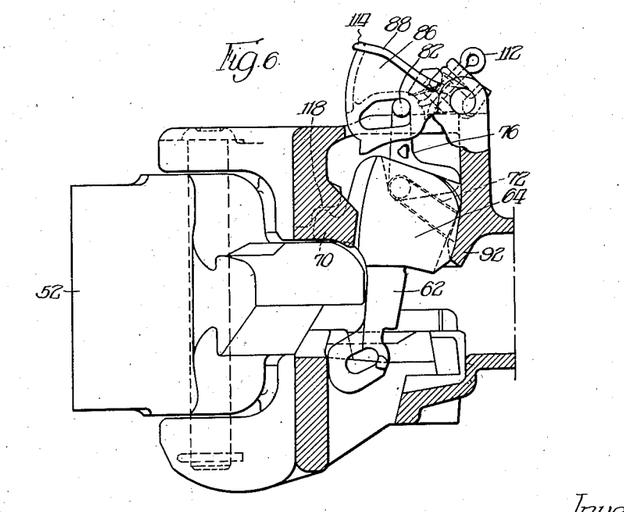
Figure 6 is a sectional elevation corresponding to Figure 2 showing the parts with the knuckle open or the parts at rest following knuckle-throw.

If the lock is elevated to lock-set position, as shown in Figure 4, and the operating device is released, the counterbalanced portion of the lift link as defined by the arm 90 immediately acts to tilt the upper end of the link, that is, the trunnion 82, rearwardly to move into and maintain the trunnions in the rear part of the slots 84. When the lift link is so disposed the arm 90 contacts wall 92 and the vertically disposed portion thereof is in position to support the rotor. The trunnions are thus disposed in the most advantageous position should it be desired to throw the knuckle open from this position by movement of the rotor.

After the coupler has been operated to full knuckle-throw position, if then the uncoupling mechanism is released, the rotor will drop a short distance until the portion defining the upper part of the slot 84 rests on trunnions 82, the lift link being maintained in its upper position in the slot 72 by virtue of the contact between the arm 90 and the upper portion of the wall 92.

In service an effective anti-creep is formed, for if the lock should move upward from its proper locked position, as shown in Figures 1 and 2, the link will also be raised slightly and the upper trunnions 82 will slide upwardly in the wide slot 84 of the lift arm adjacent the vertex 116, this upward movement of the lock and link continuing until the stops 94 and 80 contact, whereby continued movement of the lock is thus prevented. As the lower trunnions 74 of the link can move no further forward in the lock, a very slight rotary movement of the rotor can occur and the lock is effectively secured against further upward movement.

In assembling the device, the trunnions 74 of the lift link are entered into the slot 72 in the lock while the lock is being assembled into the coupler head, all in a manner as is accomplished in the standard D coupler. The lock and link are then raised to full height and the rotor slots 84 are disposed in embracing position with the trunnions 82 of the link, the embracing position being effected by inserting the trunnions into the slot 120 disposed between depending portions 122 of the arm 86, the lift rotor then being revolved through 90° whereby the trunnions 82 are entered into the slots 84.

Figure 7:
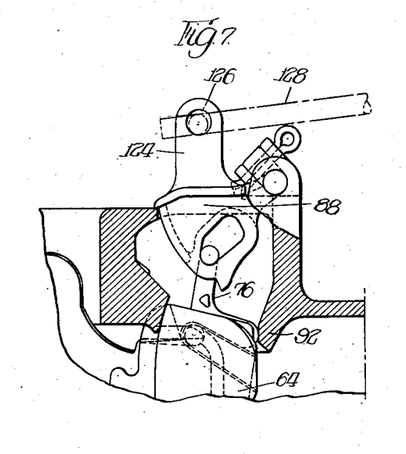
Figure 7 is a fragmentary sectional side elevation of a slightly modified form of coupler showing the same adapted for backward pull operation, the parts of the coupler being in full locked position.
Figure 8:
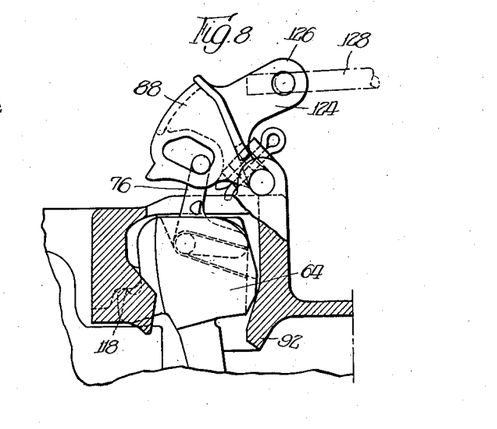
Figure 8 is a sectional elevation corresponding to Figure 7 showing the parts in full knuckle-throw position.
Figure 9:
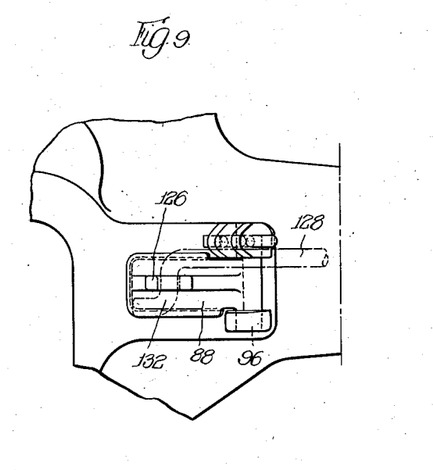
Figure 9 is a fragmentary top plan view of the coupler mechanism illustrated in Figure 7 showing the same in locked position.
Figures 10, 11:
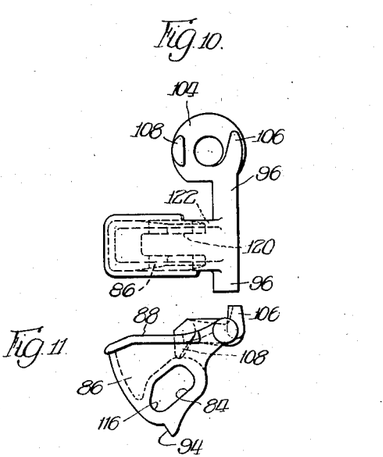
Figure 10 is a top plan view of the lift rotor for the type of coupler illustrated in Figures 1 to 6 inclusive showing the same adapted for receiving only a single operating rod.
Figure 11 is a side elevation of the lift rotor illustrated in Figure 10.
Figures 12, 13:
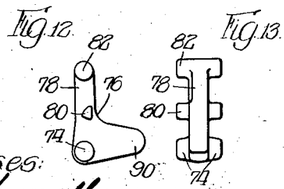
Figure 12 is a side elevation of the lift link adapted for use with the coupler mechanism illustrated in Figures 1 to 9 inclusive.
Figure 13 is a front elevation of the lift link illustrated in Figure 12.

In the case where a direct rear pull is to be used to operate the lift rotor, the eye 104 may be omitted and simply bearings 96 are used, as shown in Figures 7 to 9 inclusive. In this case, the operating mechanism is exactly the same as has already been described, the only modification being in the lift rotor, which is provided with an upstanding arm 124 provided with the eye 126 for receiving the operating rod 128, as shown in Figures 7 to 9.

Figure 14:
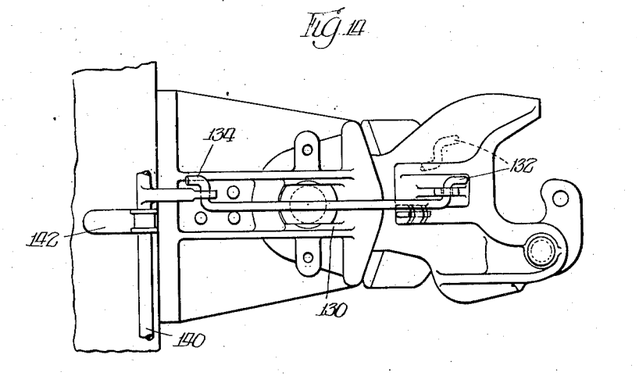
Figure 14 is a top plan view of the coupler mechanism illustrated in Figures 7 to 9 inclusive, adapted for use as an engine coupler, dotted positions of the pull rod illustrating the positions with maximum side swing of the coupler.
Figure 15:
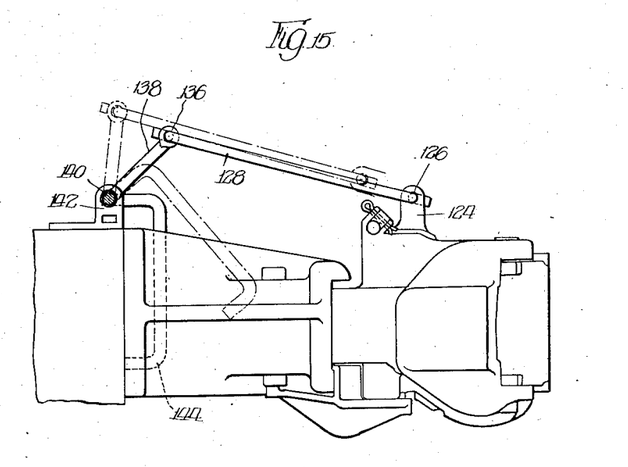
Figure 15 is a side elevation of the coupler mechanism illustrated in Figure 14, the dotted line positions illustrating the full knuckle-throw position of the operating mechanism and lift rotor.
Figure 16:
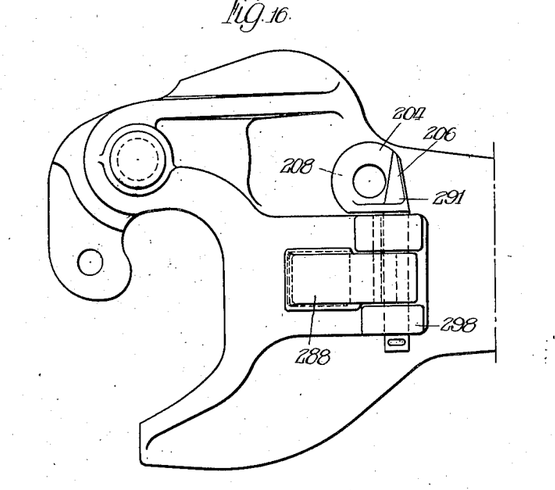
Figure 16 is a top plan view of a modified form of top operating rotary type D coupler showing the parts in locked position.
Figure 17:
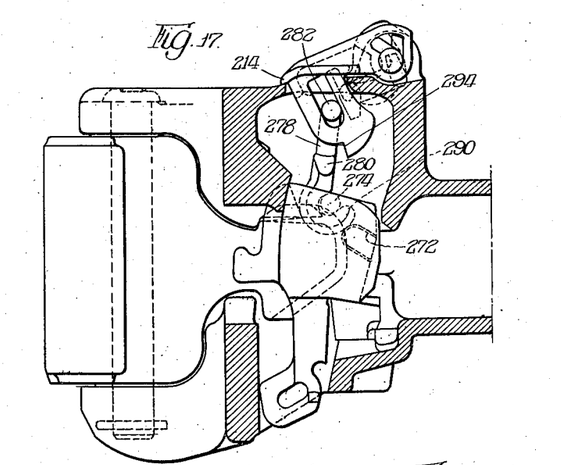
Figure 17 is a sectional side elevation of the coupler mechanism shown in Figure 16 showing the parts in locked position.
Figure 18:
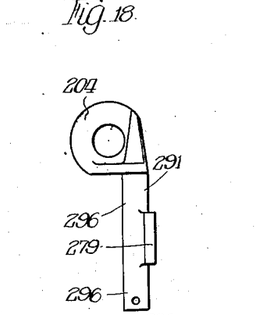
Figure 18 is a top plan view of the top rotor for the coupler construction illustrated in Figures 16 and 17.
Figure 19:
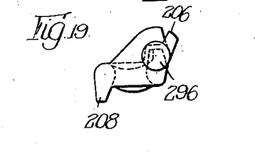
Figure 19 is a side elevation of the top rotor illustrated in Figure 18.
Figures 20, 21:
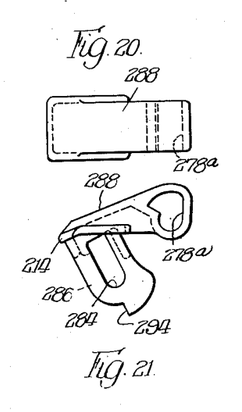
Figure 20 is a top plan view of the top rotor lifter for the coupler construction illustrated in Figure 16.
Figure 21 is a side elevation of the top rotor lifter illustrated in Figure 20.
Figures 22, 23:
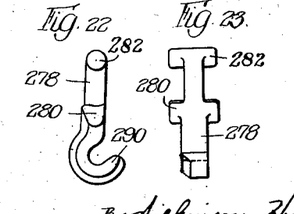
Figure 22 is a side elevation of the lift link for the coupler illustrated in Figures 16 and 17.
Figure 23 is a front elevation of the lift link illustrated in Figure 22.

In the case where the coupler is applied for engine use as shown in Figures 14 and 15, the coupler shank is mounted in the usual manner as indicated at 130. The lift rotor is provided with the upstanding arm 124 provided with eye 126 for the reception of the operating rod 128, the end of the rod 132 being substantially S-shaped for permitting proper play between the operating rod and the lift rotor arm in case of angling of the coupler. The rod extends rearwardly and is provided with a substantially S-shaped portion 134 engaging in the eye 136 of the arm 138, said arm being pivotally mounted by the operating shaft 140, said shaft being journaled in proper bearings 142, the end of said shaft being provided with the operating handle 144. With such construction, movement of the operating handle in a counter-clockwise direction moves the operating rod 128 to raise the lift rotor arm through the arm 124 by a direct backward pull.

In the form of the device illustrated in Figures 16 to 23 inclusive, the coupler lock is provided with the usual slot 272 for the usual lift link. Another slot is provided in the head of the lock and is formed with the bearing member 274 bridging the slot and being adapted to be engaged by the hooked end 290 of the lift link 278. Said lift link is provided with the stops 280 adapted to assume anti-creep position by contact with the stops 294 provided on the arms 286 of the rotor lifter 288, said rotor lifter being provided with the key slot 278a adapted to be positioned over and be engaged by the upstanding arm or key member 279 provided on the top rotor 291, said top rotor being provided with bearing portions 296 adapted to be received in suitable bearings 298 provided on the top of the coupler. The rotor is provided with the eye 204 for the reception of a rotary operating rod, the eye being provided with upstanding and depending shoulders 206 and 208 for proper operation of said rotor. The top rotor lifter is provided with a flange 214 for supporting engagement with the top of the coupler and the trunnions 282 of the lift link are engaged in elongated slots 284 provided in the rotor lifter. The operation of this modification is similar to the operation of the first embodiment, the point of support between the lift link and the lock being substantially in a vertical line over the center of gravity of the lock, thereby eliminating the tendency for the lock to bind in operation. The lock of this new arrangement is interchangeable with the lock in the old coupler, or can be used in the old coupler, and it will thus be seen that with this improved type of coupler replacements can be made from or to the old type, and little modification structurally need be made. However, the arrangement of the parts is such that decided advantages accrue from this type, and it is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. A rotor lifter including a body portion having means for mounting said lifter on a coupler, shoulders for supporting said lifter, and a depending portion having means therein whereby said depending portion receives and loosely supports coupler operating means.

2. A rotor lifter including a body portion having means for mounting said lifter on a coupler, a depending portion having spaced arms provided with means therein whereby said depending portion receives and loosely supports coupler operating means, and means on said depending portion which is adapted to have cooperative relation with associated coupler mechanism to provide an anti-creep.

3. A rotor lifter including a body portion having means for mounting said lifter on a coupler, a depending portion having spaced arms provided with means therein whereby said depending portion receives and loosely supports coupler operating means, and a depending locking shoulder on said depending portion which is adapted to have cooperative relation with associated coupler mechanism to provide an anti-creep.

4. A rotor lifter including a body portion having means for mounting said lifter on a coupler, shoulders for supporting said lifter, and a depending portion having means therein whereby said depending portion receives and loosely supports coupler operating means, and means for rotating said lifter.

5. In coupler mechanism, the combination of a swingable knuckle and a lock for said knuckle, means for transmitting operative movement to the coupler lock including a rotatable member supported by the coupler head, a lifter link associated with said member, and means for releasably connecting said link to and disconnecting said link from said rotatable member by a movement of said link at an angle to said rotatable member, said link having cooperative engagement with said lock for moving the same whereby said lock is in substantially balanced position.

6. In coupler mechanism, the combination of a swingable knuckle, a lock for said knuckle, and means for moving said lock to operate said knuckle, said means including a rotor lifter and a lift link having a loose connection therebetween for maintaining the force applied to move said lock substantially constant through lock-set position, and thereafter increasingly varying the force applied to move said lock to full knuckle throw position.

7. In coupler mechanism, the combination of a coupler head, a swingable knuckle mounted thereon, a lock for said knuckle movable within said head, a knuckle thrower for operating said knuckle upon movement of said lock, and means for moving said lock, said means including elements movable relative to said lock and having a loose connection therebetween, one of said elements being normally disposed within said head and the other of said elements being mounted exteriorly thereof for operation of the same, the relative movement between said elements at said loose connection during movement thereof for unlocking said lock increasingly varying the force effective to move said lock.

8. In coupler mechanism, the combination of a coupler head, a swingable knuckle mounted therein, a lock for said knuckle movable in said head, a knuckle thrower disposed between said knuckle and said lock for operating said knuckle upon movement by said lock, said lock being provided with a member adapted to be moved to contact a portion of said coupler head whereby further movement of said lock imparts a rotary movement to said lock for actuating said thrower, and means for moving said lock to operate said knuckle, said means being connected to said lock and substantially in vertical alignment with the center of gravity thereof and applying a lifting force in line therewith whereby said lock is substantially balanced and its movement substantially linearly only from its locked position until said member contacts a portion of said head, and means for maintaining said connection of said moving means and said lock in said alignment.

9. In coupler mechanism, the combination of a coupler head, a swingable knuckle mounted therein, a lock for said knuckle movable in said head, a knuckle thrower disposed between said knuckle and said lock for operating said knuckle upon movement by said lock, said lock being provided with a member adapted to be moved to contact a portion of said coupler head whereby further movement of said lock imparts a rotary movement to said lock for actuating said thrower, means for moving said lock to operate said knuckle, said means being connected to said lock and substantially above the center of gravity thereof and applying a lifting force in line therewith whereby initial movement of said lock from its locked position is substantially linearly, and means associated with said lock operating means whereby said lifting force is increasingly effective to move said lock during said rotary movement.

10. In coupler mechanism, the combination of a swingable knuckle, a lock for said knuckle, and means for transmitting an operative movement to the coupler lock, said means including a member movably supported on said coupler, and a second member movably connected to said first named member and said lock, said members having cooperative means adapted to have engagement for holding said lock against accidental unlocking.

11. In coupler mechanism, the combination of a coupler head having a lock cavity, a swingable knuckle mounted thereon, a lock for said knuckle and movable within said cavity, and means for operating said lock, said means including a member rotatably supported on said coupler head and adapted to seat upon said head for closing an opening of said cavity, and a member between said first named member and said lock and movably secured thereto, said first-named member being adapted to hold said second-named member in operative position.

12. In coupler mechanism, the combination of a coupler head, a swingable knuckle mounted thereon, a lock within said head for said knuckle, said lock having an enlarged body portion and a leg depending therefrom, means for moving said lock, said means including a member movable relative to said lock and engageable with said enlarged body portion at a point in substantially vertical alignment with the center of gravity of said lock, and means for maintaining said engaging relation when said lock is in a locked position.

13. In coupler mechanism, the combination of a coupler head having a lock cavity, a swingable knuckle mounted thereon, a lock within said cavity for said knuckle, said lock being formed with an inclined slot having an open end, means for moving said lock, said means including a member disposed in said cavity and movable in said slot and engageable with the end thereof opposite said open end, and means engaging said member for maintaining the engaging relation between the member and end of said slot when said lock is in a locked position.

14. In coupler mechanism, the combination of a coupler head having a lock cavity, a swingable knuckle mounted thereon, a lock within said cavity for said knuckle, said lock being formed with a slot having an end forming an abutment, and means for moving said lock, said means including a member disposed in said cavity and movable in said slot and engageable with the abutment thereof, said member being formed with a portion engageable with said coupler head adjacent said slot for maintaining said engaging relation between said member and abutment when said lock is in a locked position.

15. In coupler mechanism, the combination of a coupler head having a lock cavity, a swingable knuckle mounted thereon, a lock within said cavity for said knuckle, said lock being formed with a slot terminating substantially vertically above the center of gravity of said lock, means for moving said lock, said means including a member disposed in said cavity and movable in said slot and engageable with the end thereof for application of a lifting force in a direction substantially in vertical alignment with said center of gravity, and means for maintaining said engaging relation when said lock is in a locked position.

16. In coupler mechanism, the combination of a coupler head having a lock cavity, a swingable knuckle mounted thereon, a lock within said cavity for said knuckle, said lock being formed with with a slot terminating susbtantially vertically above the center of gravity of said lock, and means for moving said lock, said means including a member disposed in said cavity and movable in said slot and engageable with the end thereof for application of a lifting force in a direction substantially in vertical alignment with said center of gravity, said member being formed with a portion engageable with said coupler head adjacent said slot for maintaining said engaging relation when said lock is in a locked position.

17. In coupler mechanism, the combination of a coupler head, a swingable knuckle mounted thereon, a lock for said knuckle, means for holding said lock in lock-set position, means for moving said lock, said means including relatively movable members having a loose connection therebetween, and means operable upon release of said lock moving means when said lock is in a lock-set position for causing relative movement of said members whereby the effectiveness of the subsequent applied force for operating said lock is increased relative to the applied force effective in moving said lock into said lock-set position.

18. In coupler mechanism, the combination of a coupler head, a swingable knuckle mounted thereon, a lock for said knuckle, means for holding said lock in lock-set position, and means for moving said lock, said means including relatively movable members having a loose connection therebetween, one of said members being formed with a counter-balance portion operable upon release of said lock moving means when said lock is in a lock-set position for causing relative movement of said members whereby the effectiveness of the subsequent applied force for operating said lock is increased relative to the applied force effective in moving said lock into said lock-set position.

19. A lift link for a coupler including a shank having spaced pairs of trunnions thereon, and a positioning portion disposed to extend laterally of said shank.

20. A lift link for a coupler including a shank having spaced pairs of trunnions thereon, projecting elements therebetween forming anti-creep lugs, and a positioning portion extending from said shank portion.

21. A lift link for a coupler including a shank having a plurality of pairs of projecting elements spaced along the same in the direction of the longitudinal axis thereof, and a positioning portion disposed adjacent one end of said shank and angularly extending therefrom, one of said pairs of elements being disposed at the junction of said shank and positioning portion.

22. A lift link for a coupler including a shank having a plurality of pairs of projecting elements spaced along the same in the direction of the longitudinal axis thereof, and a positioning portion disposed adjacent one end of said shank and extending in a plane substantially normal to the plane of said projecting elements, one of said pairs of elements being disposed at the junction of said shank and positioning portion.

23. In coupler mechanism, the combination of a coupler head having a lock cavity, a swingable knuckle mounted thereon, a lock for said knuckle disposed in said cavity, and means for moving said lock to operate said knuckle, said means comprising a member normally disposed in said cavity and connected to said lock and a member mounted for rotation, one of said members having a slot and the other of said members having a part fitting therein whereby the members are connected together for transmitting operative movements from said last-named member to said lock, said connection between said members permitting relative movement of translation between said members, said members having means adapted to engage each other upon relative movement thereof due to accidental upward movement of said lock to provide an anti-creep therefor.

24. In coupler mechanism, the combination of a coupler head having a lock cavity, a swingable knuckle mounted thereon, a lock for said knuckle disposed in said cavity, and means for moving said lock to operate said knuckle, said means comprising members loosely connected together to permit relative movement of rotation and translation of said members, one of said members being normally disposed within said cavity and connected to said lock and the other of said members being pivotally mounted on said coupler head, said members having means adapted to engage each other upon relative movement thereof due to accidental upward movement of said lock to provide an anti-creep therefor.

25. In coupler mechanism, the combination of a coupler head having a lock cavity provided with an opening in the top of said head, a swingable knuckle mounted thereon, a lock for said knuckle disposed in said cavity, and means for moving said lock to operate said knuckle, said means comprising members connected together by a pin and slot connection to permit relative movement of rotation and translation between said members, one of said members being normally disposed within said cavity and connected to said lock and the other of said members being pivotally mounted on said coupler head adjacent said opening, said last-named member overhanging said opening and having parts in sealed relation therewith when in normal inoperative position to prevent entrance of foreign substance into said cavity, said members having stops engaging each other upon relative movement thereof due to accidental upward movement of said lock to provide an anti-creep therefor.

26. In coupler mechanism, the combination of a coupler head having a lock cavity provided with an opening in the top of said head, a swingable knuckle mounted thereon, a lock for said knuckle disposed in said cavity, and means for moving said lock to operate said knuckle, said means comprising relatively movable members, one of said members being pivotally mounted on said coupler head adjacent said opening and overhanging the same, said member having flanges overhanging the marginal edges of said opening for supporting said member and to prevent entrance of foreign substance, and a depending portion having a slot and being provided with a stop, the other of said members being normally disposed in said cavity and having a portion engaging in said slot whereby said members have relative movement of translation and rotation, said last-named member being connected adjacent its lower end to said lock and having a stop intermediate its ends engageable with the first-named stop upon relative movement thereof with said first-named member due to accidental upward movement of said lock to provide an anti-creep therefor.

27. In coupler mechanism, the combination of a coupler head, a swingable knuckle, a lock for said knuckle, and means for moving said lock, said means comprising relatively movable elements having a loose connection to provide for rotary and translatory movement therebetween, one of said elements being mounted for pivotal movement and the other of said elements being connected to said lock, said loose connection permitting movement of said last-named element relative to said first-named element to decrease the lever arm between said pivotal support for said first-named element and the connection between said elements to increase the force effective to move said lock, and an uncoupling rod for operation of said first-named element.

28. In coupler mechanism, the combination of a coupler head, a swingable knuckle, a lock for said knuckle, and means for moving said lock, said means comprising relatively movable elements having a loose connection to provide for rotary and translatory movement therebetween, one of said elements being mounted for pivotal movement and the other of said elements being connected to said lock, said loose connection providing for a substantially constant lever arm between the pivotal support for said first-named element and the connection between said elements during a portion of the movement of said lock and to permit relative movement between said elements to decrease the lever arm between said pivotal support for said first-named element and the connection between said elements to increase the force effective to move said lock, and an uncoupling rod for operation of said first-named element.

29. In coupler mechanism, the combination of a coupler head having a lock cavity, a swingable knuckle mounted thereon, a lock within said cavity for said knuckle, means for holding said lock in lock-set position, said lock being formed with a slot having an end forming an abutment, and means for moving said lock, said means including members loosely connected together to permit relative movement of rotation and translation therebetween, one of said members being disposed in said cavity and movable in said slot and engageable with the abutment thereof, said member being formed with a portion engageable with the coupler head for maintaining said engaging relation with said member and abutment when the lock is in a locked position, said portion upon release of said lock moving means when the lock is in lock-set position causing relative movement of said members whereby the effectiveness of the subsequent applied force to operate said lock is increased relative to the applied force effective to move said lock into lock-set position.

30. A lift link for a coupler, comprising a shank portion terminating in a lock cooperating portion, and spaced pairs of elements projecting from said shank, the axis of each pair intersecting the shank approximately at the axis thereof, one of said pairs of elements being substantially at one end of said shank and another of said pairs being disposed between said first-named pairs and said lock cooperating portion and immediately adjacent said last-named portion.

31. A lift link for a coupler, comprising a shank portion terminating in a lock cooperating hook portion, and spaced pairs of elements projecting from said shank, the axis of each pair intersecting the shank approximately at the axis thereof, said elements being removed from said hook portion.

32. A lift link for a coupler, comprising a shank portion terminating in a lock cooperating hook portion, and spaced pairs of elements projecting from said shank, the axis of each pair intersecting the shank approximately at the axis thereof, said elements being removed from said hook portion and one of said pairs being disposed adjacent one end of said shank.

33. In coupler mechanism, the combination of a swingable knuckle, a lock for maintaining said knuckle in operative position, and means for moving said lock, said means comprising relatively movable elements connected together by a pin and slot connection permitting movement of rotation and translation therebetween, said pin and slot connection being arranged so that when the pin is in one position in the slot the force applied to move said lock is maintained substantially constant during a portion of the movement of said lock, said members being operatively connected together so that when said slot is moved into and slightly beyond a substantially horizontal position, said pin will move therein to effect movement of translation between said members to increase the effective force applied to the lock during the remaining movement of said lock.

34. In coupler mechanism, the combination of a coupler head, a swingable knuckle mounted thereon, a knuckle thrower for operating said knuckle, a lock for said knuckle movable in said head, said lock being provided with a member adapted to be moved to contact a portion of said coupler head whereby further movement of said lock imparts a rotary movement to said lock for actuating said thrower, and means for moving said lock, said means comprising relatively movable elements connected together by a pin and slot connection permitting movement of rotation and translation therebetween, said pin and slot connection being arranged so that when the pin is in one position in the slot the applied force moves said lock substantially linearly and is maintained substantially constant during said lock movement into engagement with the coupler head, said members being operatively connected together so that when said slot is moved into and slightly beyond a substantially horizontal position, said pin will move therein to effect movement of translation between said members at substantially the time of engagement of the lock with said coupler head to increase the force applied to the lock during its rotary movement.

EDMUND P. KINNE.